United States Patent
Chrumka et al.

(10) Patent No.: US 9,264,259 B2
(45) Date of Patent: Feb. 16, 2016

(54) INSTRUCTIONAL RING TONE

(75) Inventors: Edward P. Chrumka, Grosse Pointe Park, MI (US); Scott A. Kubicki, Rochester Hills, MI (US)

(73) Assignee: General Motors LLC., Detroit, MI (US)

( * ) Notice: Subject to any disclaimer, the term of this patent is extended or adjusted under 35 U.S.C. 154(b) by 1173 days.

(21) Appl. No.: 12/651,434

(22) Filed: Dec. 31, 2009

(65) Prior Publication Data

US 2011/0159851 A1   Jun. 30, 2011

(51) Int. Cl.
*H04L 12/58* (2006.01)

(52) U.S. Cl.
CPC .............. *H04L 12/587* (2013.01); *H04L 51/24* (2013.01); *H04L 12/5895* (2013.01)

(58) Field of Classification Search
CPC .... H04L 12/5895; H04L 51/24; H04L 12/587
USPC ................ 455/41.2, 569.1, 569.2; 379/88.01, 379/88.03
See application file for complete search history.

(56) References Cited

U.S. PATENT DOCUMENTS

| | | | |
|---|---|---|---|
| 6,449,496 B1 * | 9/2002 | Beith et al. .................... | 455/563 |
| RE42,831 E * | 10/2011 | Yoon ........................... | 455/569.1 |
| 2004/0082368 A1 * | 4/2004 | Yoon ........................... | 455/569.1 |
| 2006/0040714 A1 * | 2/2006 | Suzuki ........................ | 455/569.1 |
| 2008/0032750 A1 * | 2/2008 | Koh et al. .................... | 455/566 |
| 2008/0043676 A1 * | 2/2008 | Mousseau et al. ............ | 370/331 |
| 2009/0156265 A1 * | 6/2009 | Sweeney et al. .............. | 455/567 |
| 2009/0259472 A1 * | 10/2009 | Schroeter ...................... | 704/260 |

OTHER PUBLICATIONS

"Pick up the Phone Foo" published Jun. 24th 2008 on the website: www.free-ringtones.cc/ringtones/Pick%20up%20da%20phone%20foo/5855.*

* cited by examiner

*Primary Examiner* — Ajit Patel
(74) *Attorney, Agent, or Firm* — Leydig, Voit & Mayer, Ltd.

(57) ABSTRACT

The described method and system selectively provide an instructional ring tone, configurable for both message content and frequency of playback, to aid a user in answering an incoming call via a hands free telecommunications device. The instructional ring in one aspect contains a message instructing a user as to a method of answering an incoming call. This message may be set to play the first time that an incoming call is encountered, and it may be set, e.g., by a service provider advisor, to play for a certain interval, i.e., a defined number of received calls. In this manner, the initially untrained user may become trained as to proper system operation. According to another aspect, the described system and method also improve the ease of use and operation of redundant controls for HFC or hand-held cell phone operation.

17 Claims, 6 Drawing Sheets

INSTRUCTIONAL RING TONE

BACKGROUND OF THE INVENTION

As vehicle systems have become increasingly sophisticated, they have also come to offer a rich variety of assistance, entertainment, and communications features. However, while such systems are now ubiquitous, there remain many users who are either new to such systems, or who have used their existing system for a selection of functions and have remained unfamiliar with certain other aspects of the system. An example of this problem is presented by the onboard communications facilities provided by many telematics units.

In particular, some telematics systems offer a hands free calling service (HFC), either to enhance user convenience or to facilitate user compliance with local hands free calling requirements. A user or subscriber that is an infrequent user of a hands free calling service may encounter problems when first attempting to use such a feature. Specifically, users may forget, or never have known, important command and control features or voice commands associated with the operation of the service. Moreover, while many subscribers originate outgoing HFC calls from their vehicles, fewer subscribers routinely receive calls into their vehicles via HFC.

Such infrequent users account for an inordinate share of customer care calls inquiring on the operation of the HFC service, e.g., how to answer inbound calls. For example, the vehicle occupants may hear a ring tone played within the vehicle but may be frustrated by their lack of knowledge as to how to go "off hook" to answer the incoming call. This problem is further compounded by the proliferation of redundant steering wheel controls and may also be exacerbated by the complexity associated with Bluetooth pairing of personal handsets and headsets when such apparatus are in use.

BRIEF SUMMARY OF THE INVENTION

The invention provides a system and apparatus for selectively providing an instructional ring tone that is configurable for both message content and frequency of playback. According to one aspect of the invention, the instructional ring tone may contain a message instructing the vehicle occupant as to the best method of answering an incoming call. This message may be set to play the first time that an incoming call is encountered, and it may be set, e.g., by a service provider advisor, to play for a defined number of intervals. In this manner, the initially untrained subscriber may become trained as to proper system operation. According to another aspect, the instructional ring tone may be set to "constant on" at the subscribers' discretion. This feature may be helpful when a vehicle is expected to accommodate multiple drivers, e.g., in a rental environment.

In addition to providing a convenience to users of the system, the instructional ringtone will also reduce the number of customer care calls due to user confusion over HFC operation. This will tend to decrease customer support calls so as to minimize unnecessary calls while preserving advisor time for more critical problems. In addition to these benefits, the invention also improves the ease of use and operation of redundant controls for HFC or hand-held cell phone operation. Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In overview, not intended to limit the claims, the invention includes a system for selectively providing a configurable instructional ring tone. The tone may be configured for both content and frequency, and in one aspect the instructional ring tone may contain a message instructing the vehicle occupant as to the best method of answering an incoming call. In addition to providing a convenience to users of the system, and assisting the user with redundant controls, which may be especially complex, the instructional ringtone will also tend to decrease customer support calls.

Figure 1:
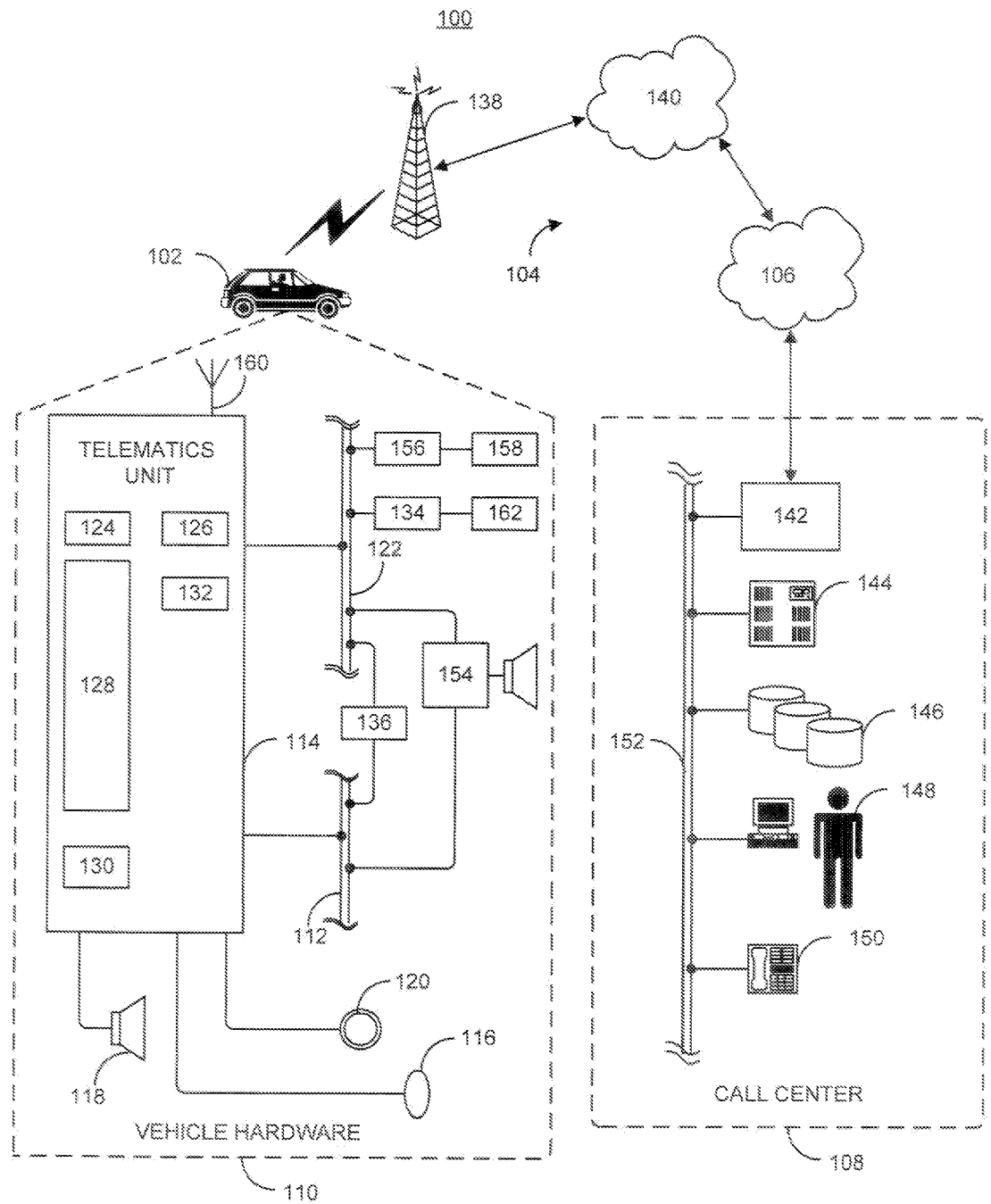
FIG. 1 is a schematic diagram of an operating environment for a mobile vehicle communication system.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted in overview above, the system and method described herein selectively provide a configurable instructional ring tone. The tone may be configured for both content and frequency, and in one aspect the instructional ring tone may contain a message instructing the vehicle occupant as to the best method of answering an incoming call. The manner in which the features and advantages of the invention are realized will be described in greater detail hereinafter.

Figure 2:
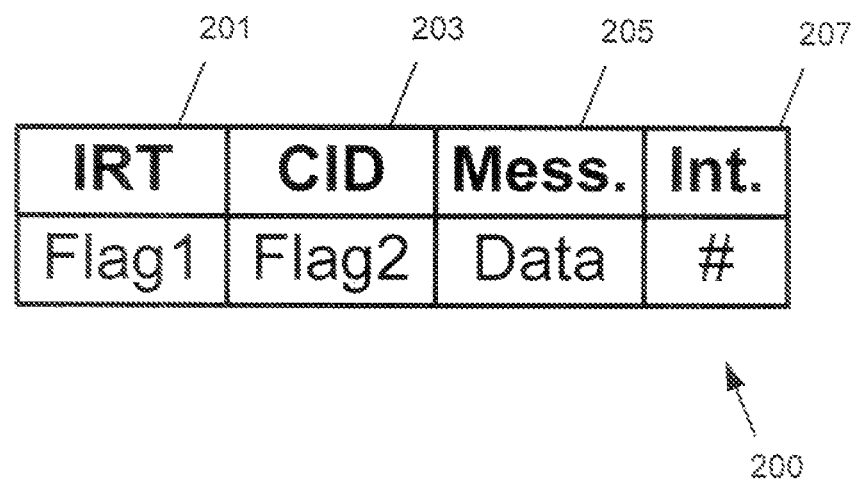
FIG. 2 is a data structure diagram showing data fields usable in an aspect of the invention.

FIG. 2 is a data structure diagram showing data fields usable in an aspect of the invention. In particular, the illustrated data structure 200 includes an Instructional Ring Tone field 201, a Caller ID Enabled field 203, a Message field 205, and an Interval field 207. The function affected by each field will be briefly described hereinafter, and may also become further apparent from the subsequent discussion of relevant processes.

The Instructional Ring Tone field 201 contains a binary flag for indicating whether the use of an instructional ring tone is enabled. Thus, setting and unsetting this flag will serve to turn the feature on and off as needed. The Caller ID Enabled field 203 is also a flag field, and contains a flag for indicating whether caller ID is enabled for the device. Thus, when the flag value is a first value, e.g., "0", caller ID is not enabled, whereas when the flag is of a second value, e.g., "1", caller ID is enabled.

As noted above, when the instructional ring tone feature is activated, an instructional message may be played. The Message field 205 is a data field used to store one or more instructional or hint messages, e.g., as a PWM record, for later playback. As further noted, the instructional message may be played every time a call is received, or may play on the first x times, or indeed only the first time. Given this, the interval field 207 serves to store an interval value indicative of when the instructional message will be played. For example, when the interval value is of a first value, the instructional message may be played only on the first call received. Similarly, when the interval is a selected one y of a range of second values, the message may be played for the first y calls received. Finally, if the interval value is of a third value, then the instruction ringtone will be played regardless of how many incoming calls have occurred.

It will be appreciated that the data structure 200, though illustrated as a single contiguous structure, may use noncontiguous physical memory locations, and may include more or fewer fields than shown, depending upon implementation preferences in any given environment.

Figure 3:
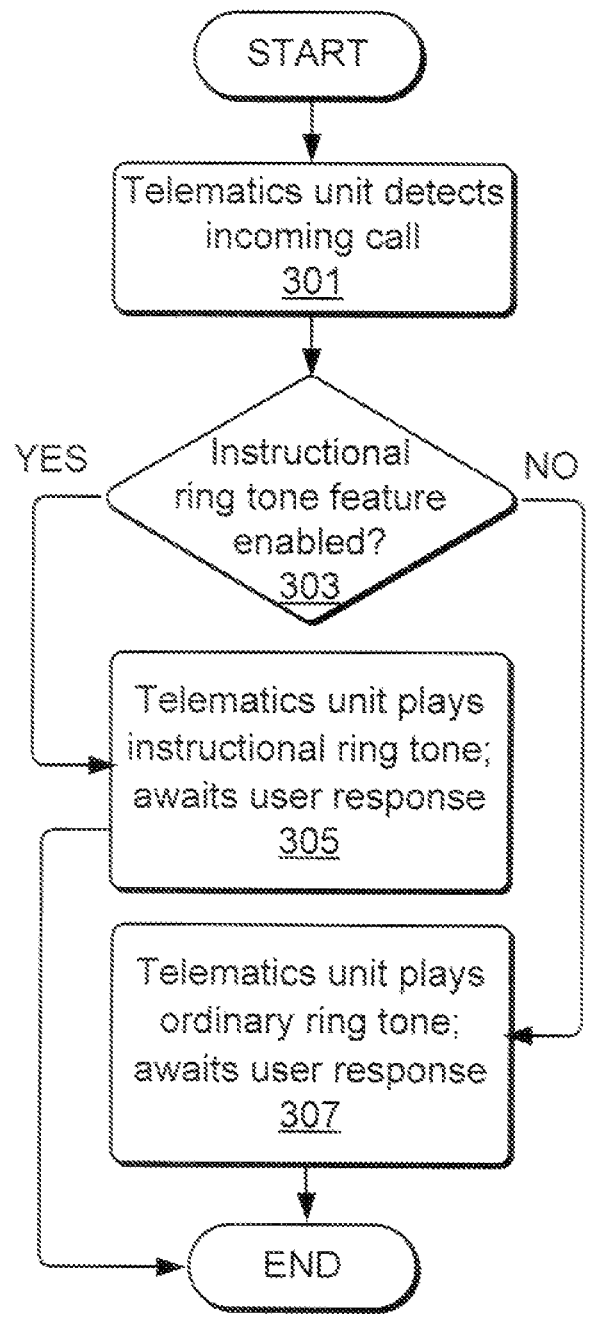
FIG. 3 is a flow chart showing in overview a process for providing an instructional ring tone according to an aspect of the disclosed principles.

Having discussed the invention in overview and having reviewed a simplified data structure usable to invoke and/or control various features of the invention, the processes used to operate the invention in various aspects will now be discussed in greater detail. FIG. 3 illustrates a flow chart of a generalized process 300 for providing an instructional ring tone to a user of a HFC enabled telematics device. For this and other figures, it will be appreciated that all steps executed by the telematics unit or other computing device are executed by the processor of the device after reading computer-executable instructions, e.g., program code, from a computer-readable medium, e.g., a disc, drive, or other tangible memory medium.

The process 300 begins at stage 301, wherein the telematics unit 114 detects an incoming call. The telematics unit 114 then determines whether the instructional ring tone feature is active in stage 303. This determination may be made by reading an appropriate data structure, e.g., by reading the binary flag of the instructional ring tone field 201 indicating whether the use of an instructional ring tone is enabled.

If it is determined at stage 303 that the instructional ring tone feature is active, then the process flows to stage 305, wherein the telematics unit plays the instructional ring tone and awaits a user response. If it is instead determined at stage 303 that the instructional ring tone feature is not active, then the process flows to stage 307, wherein an ordinary ring tone is played for the user, and the system awaits the user response. From either of stages 305 and 307, the process 300 ends once a user response is received or a maximum number of rings is reached.

Figure 4:
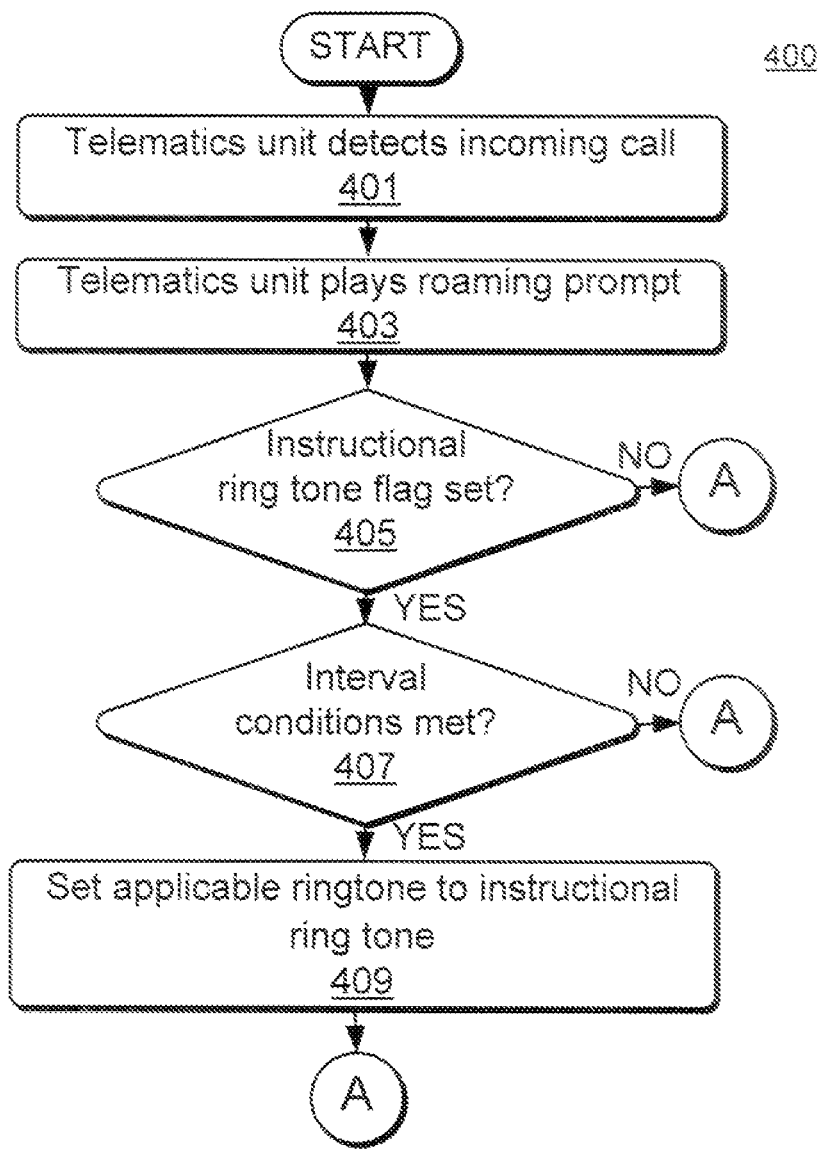
FIG. 4 is a flow chart showing a first portion of a process for providing an instructional ring tone according to an aspect of the disclosed principles.

The process 300 shown in FIG. 3 includes a base set of functionality, but it will be appreciated that other more complex functions may also be executed in keeping with the disclosed principles. Turning to FIG. 4, a process 400 is shown for executing an instructional ringtone function in greater detail in conjunction with certain optional features.

At stage 401 of the process 400, the telematics unit detects an incoming call. Proceeding to stage 403, the telematics unit plays a roaming prompt if applicable, i.e., if the present location of the telematics unit is such that the unit is operating in a roaming mode. Next, the telematics unit determines whether the instructional ring tone feature is enabled, e.g., by determining whether the instructional ring tone flag is set, at stage 405. It will be appreciated that while a flag bit may be used, there are other techniques as well that may be used to signal that the instructional ring tone feature is active.

If it is determined at stage 405 that the instructional ring tone feature is enabled, then the process flows to stage 407, wherein the telematics unit determines, e.g., by checking the value of the interval field 207, whether an instructional ringtone should be played for this incoming call. If the instructional ring tone is to be played for a certain number n of calls, then the value of the interval field 207 may start at n and be decremented each time a call is received. Thus, in this implementation, when the value of the interval field 207 reaches 0, no more instructional ring tones are to be played.

If it is determined that the ringtone feature is active and an instructional ringtone should be played for this incoming call, the process flows to stage 409, wherein the unit sets the applicable ring tone for this call to correspond to the instructional ring tone. Absent this change, the applicable ring tone would remain set by other system preferences. From stage 409, the process 400 flows to transition point A, which jumps to the start of process 500 of FIG. 5.

Figure 5:
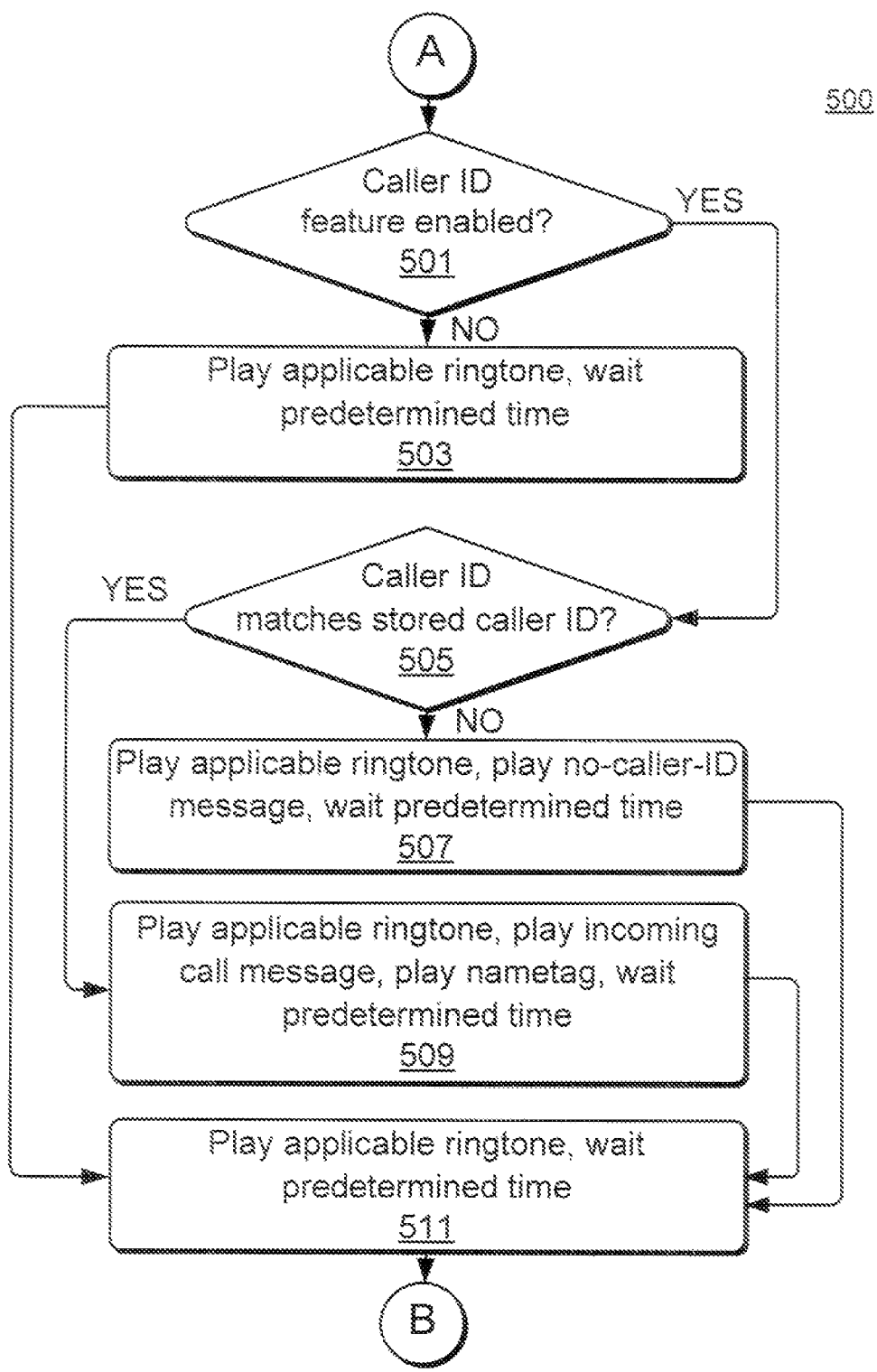
FIG. 5 is a flow chart showing a second portion of a process for providing an instructional ring tone according to an aspect of the disclosed principles.

Referring now to FIG. 5, the process 500, stemming from transition point A; moves to stage 501, wherein the telematics unit determines whether a caller ID feature of the unit is enabled. The caller ID feature allows the telematics unit to interpret and convey an ID associated with an incoming call. If it is determined at stage 501 that the caller ID feature is not enabled, the process 500 flows to stage 503, wherein the telematics unit plays the applicable ring tone, as set by process 400, and waits a predetermined amount of time, e.g., 4 seconds.

Otherwise, the process 500 flows from stage 501 to stage 505, wherein the telematics unit determines whether the caller ID associated with the incoming call matches a stored caller ID, e.g., in a stored array of known caller IDs. If it is determined that the caller ID of the incoming call matches a stored caller ID, the process flows to stage 509, wherein the telematics unit plays the applicable ringtone, plays an incoming call message, plays a nametag associated with the caller ID, and waits a predetermined amount of time. Similarly, if the caller ID associated with the incoming call does not match any stored caller ID, then the process 500 flows to stage 507, wherein the telematics unit plays the applicable ringtone, plays a no-caller-ID message, and waits a predetermined amount of time.

From any of stages 503, 507, and 509, the process 500 flows to stage 511. At this stage, if the incoming call has still not been answered or otherwise dealt with by the user or the system (e.g., by timing out), the telematics unit again plays the applicable ring tone, be it the regular ring tone or the instructional ring tone, and again waits a predetermined amount of time for a user response. If at any of stages 503, 507, 509, or 511 the user picks up the incoming call, then the illustrated call assistance process 500 ends. If the user does not pick up at any of stages 503, 507, 509, or 511, and the system does not otherwise terminate the call, the process continues to transition point B.

Figure 6:
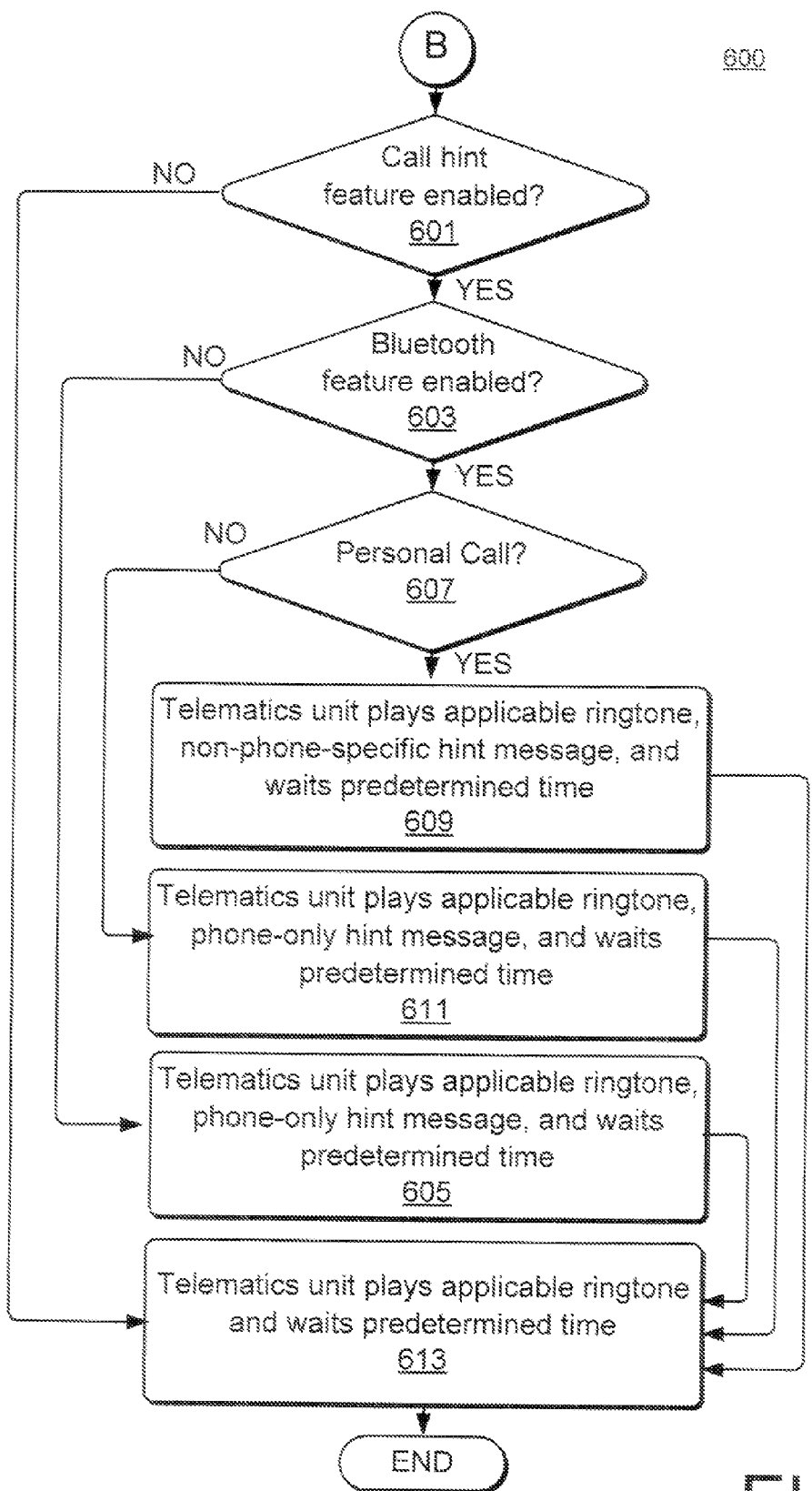
FIG. 6 is a flow chart showing a portion of a process for providing an instructional ring tone including providing a device specific hint message according to an aspect of the disclosed principles.

A process of providing further instruction to a user with respect to an as yet unanswered call is illustrated in FIG. 6. In particular, the process 600 commences at transition point B, and continues to stage 601. At this stage, the telematics unit determines whether a call hint feature is enabled. In particular, as noted above, users sometimes have difficulty with the multiple modalities through which a call may be answered. For example, a headset or other Bluetooth device may be in use in addition to the ordinary hands free equipment.

If it is determined at stage 601 that the call hint feature is enabled, the process 600 flows to stage 603, wherein the telematics unit further determines if a Bluetooth feature is enabled, i.e., if a Bluetooth device is in use. If the Bluetooth device is not in use, then the process flows to stage 605 wherein the telematics unit plays the applicable ring tone, plays a phone-specific (i.e., not Bluetooth) hint to guide the user, and waits a predetermined amount of time.

If on the other hand the Bluetooth device is in use, then the process flows to stage 607 and the telematics unit determines if the incoming call is a personal call, as opposed to a non-personal call, e.g., from a service provider advisor. At stage 609, if the call is a personal call, the telematics unit plays the applicable ring tone, plays a phone hint message that may also provide Bluetooth guidance, and waits a predetermined amount of time. If the call is not a personal call, then the process flows to stage 611, wherein telematics unit plays the applicable ringtone, a phone-only hint message, and waits a predetermined time.

If at stage 601 it was determined that the call hint feature is not enabled, or if the call is not answered in any of stages 605, 609, and 611, then the process 600 flows to stage 613. In stage 613, the telematics unit plays the applicable ringtone and waits a predetermined time for the user to answer the call.

In this way, the user is provided with device-specific answering information to assist the new user in answering an incoming hands free call. At the same time, the system settings are configurable so that experienced users are not required to listen to instructional messages or hints.

It will also be appreciated, however, that the foregoing methods and implementations for solving phone usage problems are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing instruction for placing and receiving calls to a user of a mobile hands-free telecommunication device having an instructional ring tone feature including a verbal message instructing the user of the mobile hands-free telecommunication device as to a manner of answering the incoming call, the method comprising:
   detecting, by the mobile hands-free telecommunication device, an incoming call;
   determining, by the mobile hands-free telecommunication device, that the instructional ring tone feature is enabled;
   determining, by the mobile hands-free telecommunication device, that an instructional ring tone is to be played based on a configurable interval parameter; and
   playing, in response to determining that the instructional ring tone feature is enabled and that the instructional ring tone is to be played, by the mobile hands-free telecommunication device, the instructional ring tone containing the verbal message instructing the user as to a manner of answering the incoming call, wherein the verbal message includes verbal instructions regarding how to use voice commands for a hands-free calling service of the mobile hands-free telecommunication device;
   wherein in a first configuration, the interval parameter enables the instructional ring tone to be played only for a specified number of calls; and
   wherein in a second configuration, the interval parameter enables the instructional ring tone to be played every time a call is received.

2. The method according to claim 1, further comprising playing a non-instructional ring tone after playing the instructional ring tone.

3. The method according to claim 1, further comprising playing a roaming prompt to the user of the mobile hands-free telecommunication device.

4. The method according to claim 1, further comprising:
determining, prior to playing the instructional ringtone, that an instructional ring tone flag is set.

5. The method according to claim 1, further comprising:
detecting that an auxiliary communications device is connected to the mobile hands-free telecommunication device; and
playing, in response to detecting the auxiliary communications device, a hint message in addition to playing the instructional message, the hint message being configured to provide information regarding the operation of the auxiliary communications device.

6. The method according to claim 5, wherein the auxiliary communications device is a Bluetooth headset device.

7. The method according to claim 5, wherein the incoming call is designated as one of a personal call and a non-personal call, and wherein the information provided by the hint message is based at least in part on the designation of the incoming call.

8. The method according to claim 7, wherein the incoming call is designated as a personal call, and wherein the information provided by the hint message directs the user to answer via a headset.

9. A telematics unit for providing wireless telephonic communications to a user, the telematics unit including a processor for executing computer-executable instructions contained on a non-transitory computer-readable medium, wherein the computer-executable instructions comprise instructions for:
detecting an incoming call;
determining that the instructional ring tone feature is enabled;
determining that an instructional ring tone is to be played based on a configurable interval parameter; and
playing, in response to determining that the instructional ring tone feature is enabled and that the instructional ring tone is to be played, the instructional ring tone containing a verbal message instructing the user as to a manner of answering the incoming call, wherein the verbal message includes verbal instructions regarding how to use voice commands for a hands-free calling service of the telematics unit;
wherein in a first configuration, the interval parameter enables the instructional ring tone to be played only for a specified number of calls; and
wherein in a second configuration, the interval parameter enables the instructional ring tone to be played every time a call is received.

10. The telematics unit according to claim 9, wherein the computer-executable instructions further comprise instructions for playing a non-instructional ring tone after playing the instructional ring tone.

11. The telematics unit according to claim 9, wherein the computer-executable instructions further comprise instructions for playing a roaming prompt to the user of the telematics unit.

12. The telematics unit according to claim 9, wherein the computer-executable instructions further comprise instructions for:
determining, prior to playing the instructional ringtone, that an instructional ring tone flag is set.

13. The telematics unit according to claim 9, wherein the computer-executable instructions further comprise instructions for:
detecting that an auxiliary communications device is connected to the telematics unit; and
playing, in response to detecting the auxiliary communication device, a hint message in addition to playing the instructional message, the hint message being configured to provide information regarding the operation of the auxiliary communications device.

14. The telematics unit according to claim 13, wherein the auxiliary communications device is a Bluetooth headset device.

15. The telematics unit according to claim 13, wherein the incoming call is designated as one of a personal call and a non-personal call, and wherein the information provided by the hint message is based at least in part on the designation of the incoming call.

16. The telematics unit according to claim 15, wherein the incoming call is designated as a personal call, and wherein the information provided by the hint message directs the user to answer via a headset.

17. A method of providing instruction for placing and receiving calls to a user of a mobile hands-free telecommunication device having an instructional ring tone feature including a verbal message instructing the user of the mobile hands-free telecommunication device as to a manner of answering the incoming call, the method comprising:
detecting, by the mobile hands-free telecommunication device, an incoming call;
determining, by the mobile hands-free telecommunication device, that the instructional ring tone feature is enabled;
detecting that an auxiliary communications device is connected to the telematics unit; and
playing, in response to determining that the instructional ring tone feature is enabled and detecting the auxiliary communication device, (1) an instructional ring tone containing the verbal message instructing the user as to a manner of answering the incoming call, wherein the verbal message includes verbal instructions regarding how to use voice commands for a hands-free calling service of the mobile hands-free telecommunication device, and (2) a hint message, the hint message being configured to provide information regarding the operation of the auxiliary communications device;
wherein the method further comprises:
determining, prior to the playing, that the instructional ring tone is to be played based on a configurable interval parameter;
wherein in a first configuration, the interval parameter enables the instructional ring tone to be played only for a specified number of calls; and
wherein in a second configuration, the interval parameter enables the instructional ring tone to be played every time a call is received.

* * * * *